Patented June 7, 1927.

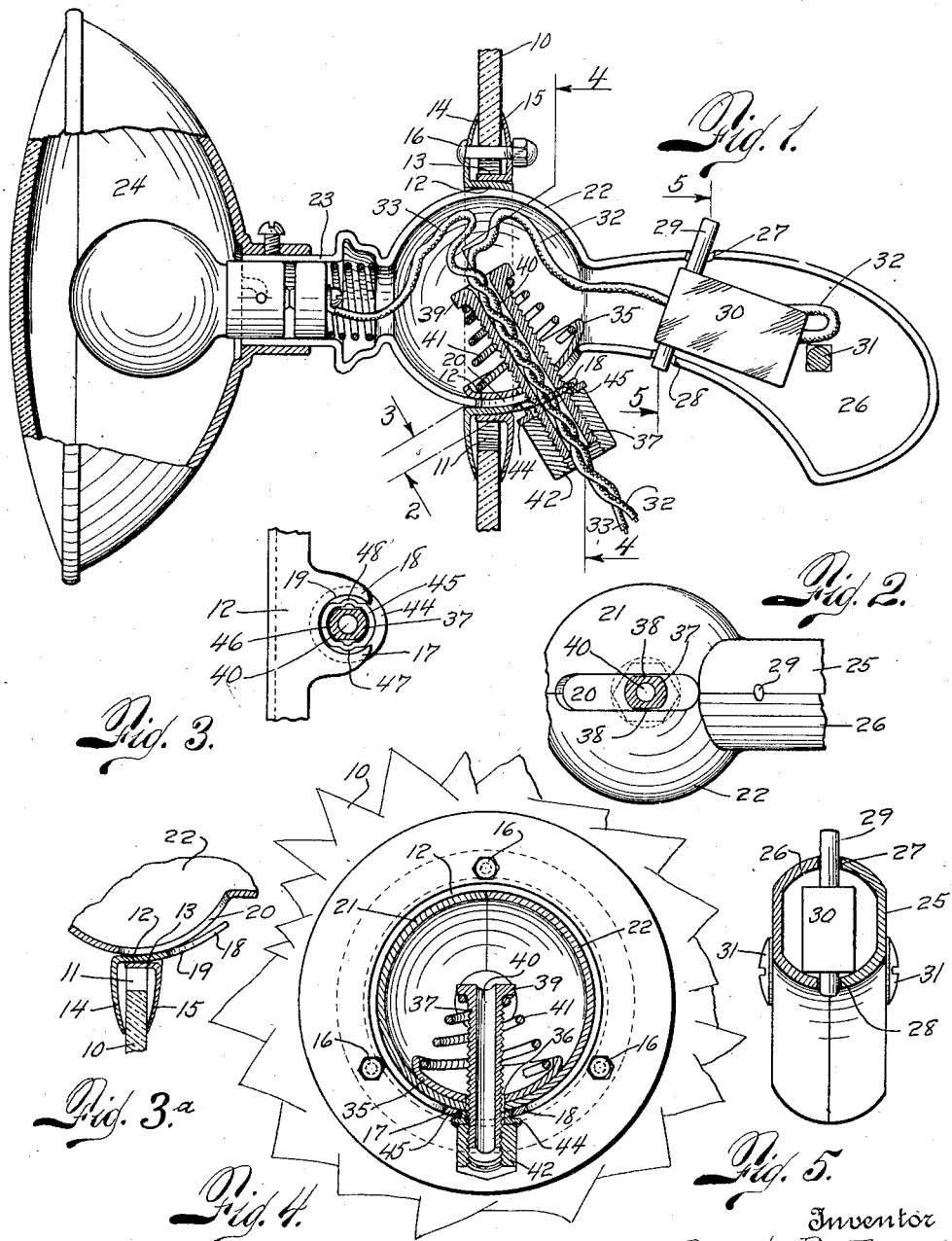

1,631,480

UNITED STATES PATENT OFFICE.

ROBERT R. FREUND, OF DENVER, COLORADO.

DIRIGIBLE LIGHT MOUNTING.

Application filed June 6, 1925. Serial No. 35,454.

This invention relates to improvements in dirigible light mountings, and the invention itself more particularly embodies substantially improved means, with reference to certain elements thereof both in an individual sense and as associated in combined relation, adapted more especially to be attached to the windshield of an automobile, for dirigibly mounting what is now commonly known as a spotlight.

It has already been proposed to directly associate a spotlight with the windshield of an automobile, the advantages of which are fully understood, and one of the ways heretofore adopted for accomplishing this, which I also generically follow, has been by means of a substantial opening in the windshield, at an appropriate position, for the reception of a ball and socket support, the ball element of which has a forwardly and rearwardly projecting arm that carries a lamp or light on its outer end, spaced from the outside face of the windshield, while its inner end is disposed as a handle for manipulation from the inside of the automobile.

The ball element in such cases, however, has customarily been directly mounted and retained by means of a spaced pair of vertically disposed or double ring elements which are suitably clamped to the windshield, around the zone of said opening therethrough, and at positions forwardly and rearwardly thereof, the inner peripheral surface of each of these ring elements providing for an annular bearing, and the two ring elements taken together, therefore, forming a double ring bearing or mounting for seating the ball element in retained relation but with substantial universal play.

It accordingly follows in such cases that, if it is desired to detach the ball with its operating handle and lamp for any reason, such for instance as to use the same as a trouble light, and it is oftentimes desirable to do this, it then becomes necessary to separate or disrupt the ring mountings for fully releasing the ball, whereupon the forward ring element will remain upon and dangle from the lamp arm support between the ball and the lamp. This is obviously a very undesirable feature of such arrangements, and there is also much room for other improvements thereover, not only in point of actual functioning but further in point of prolonging durability and decreasing the costs of production.

One of the primary objects of my invention, therefore, has been to devise simple means for effectively overcoming the aforesaid undesirable feature, and the same is accomplished by employing a specially formed and equipped one of the paired clamping ring elements as the sole actual bearing seat for the ball element, whereby the ball element will be snugly seated wholly thereby but with substantially universal play and in facilely demountable relation, without the necessity of disturbing either of said clamping ring elements when once attached to the windshield, the said ball element being held up annularly against the inner peripheral face of said specially formed ring element by means of resiliently controlled retaining elements under regulable tension.

Another preferable feature of the improvements is to provide the ball element, together with the lamp arm support and its operating handle, as a separable or divided two-part hollow unit, the sections of which may preferably be stamped out of metal, with the opposed lamp arm support and handle sections respectively made integrally with their intermediate complementary semi-spherical section or half of the ball element. This construction would not only provide for economical manufacture and assembly, as well as insuring more lasting durability and maximum strength against any breakage or separation of these parts, but also such a hollow construction provides for the neatly compact housing of certain elements, including more especially the housing within the ball itself of the major portion of the aforementioned resiliently controlled ball retaining elements, and one of which retaining elements may provide for, as a further desired aim of the improvements, a conduit tube or sleeve for the passage of the circuit wires leading from the current supply source to the lamp and to an electric switch, which latter is housed within the hollow handle portion.

The foregoing and other objects and advantages, however, including simplicity of parts, compactness in combined structure, neatness of appearance, effective operation and durability in use, and comparatively low costs for production and installation, will be clearly apparent as incidental to the following disclosure, and with these general outlining remarks, therefore, reference will now be immediately had to the accompanying drawings, illustrating a practical embodiment of the improvements, in which drawings Figure 1 is a central vertical longitudinal sectional view through the improved light mounting as an assembled whole, with one-half of the ball, handle and lamp arm support removed, and as associated with the windshield of an automobile, although as a matter of fact the glass windshield shown, in so far as the actual invention is concerned, could be any wall and not necessarily the windshield of an automobile;

Figure 2 is a fragmentary cross-sectional view, taken along the line 2 of Figure 1, and looking towards the underneath face of the ball element;

Figure 3 is a fragmentary cross-sectional view, taken along the line 3 of Figure 1, and looking towards the lower peripheral inside face of the actual seating ring element, for the ball, and a bifurcated rearwardly projected lip thereof;

Figure 3ª is a fragmentary sectional view, analogous to Figure 1 with the resiliently controlled ball retaining means omitted, being substantially a cross-sectional view of Figure 3 with said retaining means omitted, for more clearly showing the disposition of said bifurcated lip relatively to the ball element;

Figure 4 is a vertical transverse cross-sectional view along the line 4—4 of Figure 1, with the circuit wires omitted; and Figure 5 is a vertical transverse cross-sectional view substantially along the line 5—5 of Figure 1, with the electrical switch element shown conventionally in outline only.

The numeral 10 indicates any suitable wall support, although designated as the windshield of an automobile, which is provided with an enlarged aperture 11, for the reception of annular inturned inner peripheral webs or rims 12 and 13, respectively, of forwardly and rearwardly located flanged clamping ring elements, the webs 14 and 15 of which are preferably of opposed concave form and slightly springy, for tensional clamping to the wall 10 around its aperture 11, being clamped thereto as by bolts 16 extending through said aperture, and shown equidistantly spaced apart.

The rim 13 of the rear ring element is adapted to snugly encompass the rim 12 of the forward ring element, but it is to be particularly noted that the inner peripheral face of the rim 12 is formed with a laterally curving concave face that is of gradual slightly increasing diameter from its rear to its forward edge, so that the ball element may be freely inserted and withdrawn through the forward opening, and it being further noted that from the lower rear edge of said rim 12 there is rearwardly projected a bifurcated or slotted lip or lug, indicated by the laterally inturning claw-like fingers 17—18, the slot thereof opening rearwardly and being otherwise of annular-like form as indicated at 19. These fingers preferably do not follow the arcuate curve of the rim 12, so that they will be slightly spaced from the ball element which will now be described.

The ball element is a two-part hollow shell formed of semi-spheroidal sections 21 and 22, each of which is provided at its lower rear edge face with a complementary recess that together form a lower rearwardly located elongated slot 20, the longitudinal edge faces of which are parallel.

The ball element has a forwardly projected lamp arm support 23, for carrying the lamp reflector casing 24 and mounting and housing the contact end of the electric lamp therefor, with its associated parts not necessary to describe, and the ball elements are also provided with a rearwardly projected chambered operating handle, which latter may be in the form of a pistol grip. As has before been stated, these parts are preferably die-pressed or stamped as a whole, in half sections, from a suitable metal, both for economy in production and durability and strength in use, and would then consist of the integrally formed shell sections 21—23—25 and 22—23—26. The hollow handle sections 25—26 may be formed with complementary edge face recesses to provide upper and lower small apertures 27—28 for the reception of a reciprocating switch-throw rod 29, shown in circuit-closing position, associated with suitable contact elements of an electric switch, contained in the handle chamber and shown conventionally in outline at 30, although obviously the switch may be of any suitable type and controlled by a trigger arm if desired, in the manner of a pistol trigger, as is well understood and practised with these devices. Also, although not specially illustrated, the handle portion may be substantially weighted, if desired, by any suitable weighting element, preferably contained within the rear end of the hollow handle, to serve as a counterbalancing weight for the forward lamp supporting end of the device.

One of the switch contact elements may be grounded to the handle section, in circuit with the ferrule base of the electric lamp, with an insulated circuit wire 32 leading from the other contact element of the switch to the electric supply source, while another insulated circuit wire 33 leads from said electric supply source direct to the central terminal contact means for the lamp, and when the aforesaid halved sections are assembled, with various elements housed therein as hereinafter appearing, they are securely held together, for conjoint actuation, by means of a cross-bolt 31 or equivalent means.

Before the halved sections are assembled, however, there is placed in one half of the ball section the resiliently controlled retaining means, hereinbefore mentioned, embodying a dished member 35, centrally apertured as at 36, through which aperture there is projected an externally threaded rod 37, having a flanged head or shoulder 39 at its inner end, between which and the concave face of the dished member 35 there is interposed a coil spring 41, and the outer end of said rod being adapted to extend through the aforesaid slot 20 to receive an adjusting and locking nut 42, with a specially formed washer later referred to. A pair of the opposed sides of the rod 37 are flattened and not threaded, as at 38, seen more clearly at Figures 2 and 3, and the aperture 36 of the dished member 35 is of the same shape as the cross-section of said rod, whereby the rod 37 is longitudinally adjustable through said dished member, but is secured thereto against independent arcuate movement, the outer convex surface of said dished member being of the same curvature as and adapted to seat down against the inside surface of the ball element, in relatively arcuate sliding relation with and as a covering closure for the said slot 20. The rod 37 is preferably provided with a longitudinal bore 40 therethrough or in other words it is preferably an open-ended short tube, in which event it would also serve as a conduit sleeve or tube for the passage of the circuit wires 32—33, in addition to its primary functioning as an element of the aforesaid retaining means, under regulable tension, for holding the ball element seated up against its supporting bearing ring element 12 as will later appear.

Obviously, therefore, the making of this rod 37 of tubular form is a very important feature of the present improvements, but as a matter of fact it is not strictly essential that it necessarily be tubular, in so far as the broader invention is involved, because the circuit wires 32—33 could be disposed otherwise than actually passing through said rod 37, although any other arrangement would neither be so convenient nor satisfactory from various aspects.

The inside face of the nut 42 mounts a washer 44 that has a central aperture 46 of the contour of the cross-section of the rod 37, the said aperture being bounded by an inner peripheral flange rim 45, a pair of opposed portions of which are of annular disposition and alternate with opposed parallel portions. Each of the said parallel sides have an outwardly projecting radial lug, stop or rounded teat-like protuberance, indicated at 47—48 in Figure 3, which may be formed by depressions on the inside faces of said sides, and which terminate approximately at positions in the arc of said annularly disposed sides.

As will be seen from Figures 1, 3 and 4, the inner flange rim 45, of the washer 44, is adapted for rotatable mounting within the annular-like slot 19, formed between the laterally inturning claw-like fingers 17—18 that are projected from the lower rear portion of the bearing rim 12, the stops 47—48 preventing any dislodgment through the rearwardly opening end of the slot 19, when the parts are in the position shown at Figure 3, and the annularly disposed portions of the rim 45 likewise preventing any such dislodgement at other rotated positions of the washer.

Now, assuming that the parts 12 to 18 are mounted in attached association with the apertured windshield or wall 10, the manner of attachment being obvious from Figure 1 and the foregoing description, and further assuming that the parts 21 to 44 have been assembled as the lamp supporting unit, which also will be understood from the foregoing description, then in order to mount this lamp supporting unit, and exactly the reverse will be true with reference to the facile dismounting of the same, the handle 25—26 is initially projected rearwardly through the rim 12 until the approximately central portion of the ball element is encompassed by said rim. To do this more readily, the rod 37 should be positioned towards the rear end of the slot 20. With the nut 42 unscrewed out towards the end of the rod 37, this rod is now moved forwardly in the slot 20 until the rim 45, of the washer 44, is disposed directly underneath the annular-like slot 19 of the bifurcated lip of the rim 12, the rod 37 passing in between the fingers 17—18 thereof, whereupon and on screwing up the nut 42 the rim 45, of the washer 44, will enter the said annular-like slot 19, in rotatable relation therein but held against dislodgment through the rearwardly opening end of said slot, while the upper face of the washer proper will seat up against the underneath faces of said fingers.

As the nut 42 is screwed home on the rod 37, it will be apparent that the rod 37 will be radially drawn outwardly, thus compressing the spring 41 and forcing the dished member 35 rearwardly and downwardly in snug and firm contact, but with resilient give, against the inner surface of the ball element in the zone of its elongated slot 20. In doing this, it follows that the ball element itself will be drawn inwardly, with a rearwardly and downwardly exerted force, for the snug universally rotatable seating of the same annularly against the rear inner bearing surface of its seating rim 12, being entirely out of contact with the open forward portion of said rim 12, at which forward position the said rim is of slightly greater diameter than the diameter of the ball. Accordingly, any suitable tension may thus be imposed upon the ball, with reference to the desired degree of frictional control thereof, for holding the same resiliently adjusted, in universally rotatable bearing engagement, firmly against its annular seating face, which latter is supplied solely by the inner peripheral surface of the rim 12.

Although thus interlockingly mounted against rearward displacement, and substantially so against forward displacement, excepting that there would be a very limited give forwardly under resilient tension, which could be availed of to relieve friction in shifting the light to varying positions, it will nevertheless be readily seen that the ball element, and hence the lamp, may be turned in any vertical or lateral arc within certain limits, restricted only by the lamp casing contacting the wall 10, but, if desired, suitable means could readily be supplied to limit the upward swing of the lamp, beyond a predetermined horizontal plane, when in substantially centralized position.

This substantially universal movement is permitted because when the ball is turned vertically its slot 20 permits of a free motion of the ball in that direction, excepting for the resilient tension thereon, relatively to the radially anchored rod 37 contained within said slot, but when the ball is turned laterally it will rotate conjointly with the rod 37, as its axis, and with the dished member 35, the washer 44 and the nut 42, the said washer providing an outer bearing for the rod 37, being interposed between the nut 42 and the aforesaid bifurcated lip, so that the nut 42 will turn in fixed relation with the rod, and therefore will neither be loosened nor tightened up thereon when the rod turns about its longitudinal axis.

Although I have thus fully set forth the invention from various angles, it will nevertheless be understood that I do not wish to unnecessarily restrict the improvements to all of the details exactly as disclosed, excepting as they may come within the terms of the claims, or equivalent elements or combinations thereof, or as fairly interpreted in the light of the specification if necessary, because it is obvious that some of the features may be altered or substituted for without departing from the spirit of the invention.

What I do claim, however, as new and patentable, is:—

1. In dirigible light mountings, the combination of a ball seating rim of approximately spherical curvature, a ball mounted therein and thereby as a sole bearing support for said ball, lamp supporting means associated with said ball, the rear of said rim having a bifurcated ear, forming a slot open at its outer end, and said ball having an interior chamber with a peripherally opening elongated slot, for registration with the slot of said ear, a radial rod longitudinally movable through said slots, a retaining member within said ball and associated with said rod to be held thereby in engagement with the inner peripheral face of said ball, and external means coacting with said ear and the outer end of said rod for radially adjusting said rod.

2. In dirigible light mountings, the combination of a ball seating rim of approximately spherical curvatures, a ball mounted therein and thereby as a sole bearing support for the ball, lamp supporting means associated with said ball, the rear of said rim having a bifurcated ear, forming a slot open at its outer end, and said ball having an interior chamber with a peripherally opening elongated slot, for registration with the slot of said ear, a radial rod longitudinally movable through said slots, a retaining member freely encompassing said rod within said ball and in engagement with the inner peripheral face of the latter, resilient means engagingly interposed between the inner portion of said rod and said retaining member, and external means coacting with said ear and the outer end of said rod for radially adjusting said rod.

3. In dirigible light mountings, the combination of a ball seating rim of approximately spherical curvature, a ball mounted therein and thereby as a sole bearing support for the ball, lamp supporting means associated with said ball, the rear of said rim having a bifurcated ear, forming a slot open at its outer end, and said ball having an interior chamber with a peripherally opening elongated slot, for registration with the slot of said ear, a radial rod threaded at its outer end and longitudinally movable through said slots, a retaining member within said ball and so associated with said rod as to be suitably held thereby in engagement with the inner peripheral face of said ball, a nut on the outer end of said rod, and a washer interposed between said nut and said bifurcated ear, the said washer having a central inturned flange rim entering the slot of said ear.

4. In dirigible light mountings, the combination of a ball seating rim of approximately spherical curvature, a ball mounted therein and thereby, lamp supporting means associated with said ball, the rear of said rim having a bifurcated ear, forming a slot open at its outer end, and said ball having an interior chamber with a peripherally opening elongated slot, for registration with the slot of said ear, a radial rod longitudinally movable through said slots, the said rod having an opposed pair of flattened sides and being threaded at its outer end, a retaining member within said ball and so associated with said rod as to be suitably held thereby in engagement with the inner peripheral face of said ball, a nut on the outer end of said rod, and a washer interposed between said nut and said bifurcated ear, the said washer having a central inturned flange rim entering the slot of said ear, the said flange rim having an opposed pair of flattened sides, forming its aperture of the same cross-sectional form of said rod, and the flattened sides of said flange rim being provided with outwardly disposed stops terminating in the arc of its rounded sides.

5. In dirigible light mountings, the combination of a ball seating rim of approximately spherical curvature, a hollow ball mounted therein and thereby and having a forward electric lamp supporting arm and a rearwardly disposed chambered handle, the rear of said rim having a bifurcated ear forming a slot, open at its outer end, for registration with an elongated slot through the wall of said ball, an electric switch carried by said handle, a hollow radial rod longitudinally movable through said slots, a retaining member within said ball and so associated with said rod as to be suitably held thereby in engagement with the inner peripheral face of said ball, and external means coacting with said ear and the outer end of said rod for radially adjusting the latter, the said hollow rod additionally functioning for the passage of circuit wires in connection with said lamp and switch.

6. In dirigible light mountings, the combination of a ball seating rim of approximately spherical curvature, a hollow ball mounted therein and thereby and having a forward electric lamp supporting arm and a rearwardly disposed chambered handle, the rear of said rim having a bifurcated ear forming a slot, open at its outer end, for registration with an elongated slot through the wall of said ball, an electric switch carried by said handle, a hollow radial rod longitudinally movable through said slots, a retaining member freely encompassing said rod within said ball and in engagement with the inner peripheral face of the latter, resilient means engagingly interposed between said rod and said retaining member, and external means coacting with said ear and the outer end of said rod for radially adjusting the latter, the said hollow rod additionally functioning for the passage of circuit wires in connection with said lamp and switch.

7. In dirigible light mountings, the combination of a ball seating rim of approximately spherical curvature, a combined hollow ball, electric lamp arm support and operating handle, integrally formed as two-part separable shell sections, the said ball being mounted within said rim as the bearing support for the ball, and the rear of said rim having a bifurcated ear forming a slot, open at its outer end, for registration with an elongated slot through the wall of said ball, a radial rod longitudinally movable through said slots, a retaining member within said ball and so associated with said rod as to be suitably held thereby in engagement with the inner peripheral face of said ball, and external means coacting with said ear and the outer end of said rod for radially adjusting said rod.

In testimony whereof, I affix my signature.

ROBERT R. FREUND.